(12) United States Patent
Kogure et al.

(10) Patent No.: US 7,802,931 B2
(45) Date of Patent: Sep. 28, 2010

(54) LENS ACCESSORY MOUNTING DEVICE

(75) Inventors: Yuji Kogure, Saitama (JP); Hiroaki Suzuki, Saitama (JP)

(73) Assignee: Hoya Corporation, Tokyo (JP)

( * ) Notice: Subject to any disclaimer, the term of this patent is extended or adjusted under 35 U.S.C. 154(b) by 622 days.

(21) Appl. No.: 11/766,247

(22) Filed: Jun. 21, 2007

(65) Prior Publication Data

US 2007/0297790 A1    Dec. 27, 2007

(30) Foreign Application Priority Data

Jun. 23, 2006    (JP)    ............................... 2006-173419

(51) Int. Cl.
G03B 17/00    (2006.01)
(52) U.S. Cl. ...................... 396/531; 359/828
(58) Field of Classification Search ................. 396/529, 396/531; 359/819, 825, 827, 828
See application file for complete search history.

(56) References Cited

U.S. PATENT DOCUMENTS

| | | | | |
|---|---|---|---|---|
| 2,794,360 | A * | 6/1957 | Eagle | ........................ 359/828 |
| 3,758,198 | A * | 9/1973 | Kanie et al. | ................ 359/828 |
| 4,416,528 | A * | 11/1983 | Breslau et al. | .............. 396/544 |
| 5,483,384 | A * | 1/1996 | Takizawa et al. | ............ 359/827 |
| 6,269,227 | B1 | 7/2001 | Hamasaki et al. | |
| 6,341,902 | B1 | 1/2002 | Sato et al. | |
| 6,768,596 | B2 | 7/2004 | Hattori et al. | |
| 2001/0053289 | A1* | 12/2001 | Imanari et al. | .............. 396/531 |
| 2005/0030410 | A1* | 2/2005 | Tsukatani et al. | ........... 348/360 |
| 2006/0007551 | A1* | 1/2006 | Sakurai et al. | .............. 359/611 |

FOREIGN PATENT DOCUMENTS

JP    6 265767    9/1994

OTHER PUBLICATIONS

English Language Abstract of JP 6-265767.
U.S. Appl. No. 11/766,263 to Kogure et al., filed Jun. 21, 2007.
U.S. Appl. No. 11/766,211 to Kogure, filed Jun. 21, 2007.

* cited by examiner

*Primary Examiner*—Melissa J Koval
*Assistant Examiner*—Autumn Parker
(74) *Attorney, Agent, or Firm*—Greenblum & Bernstein P.L.C.

(57) ABSTRACT

A lens accessory mounting device for mounting a lens accessory to a front end of a lens barrel, an outer diameter of the lens accessory being substantially the same as an outer diameter of the front end of the lens barrel, the lens accessory mounting device includes at least one inward bayonet lug which projects radially inwards from an inner peripheral surface of a front end of the lens barrel; and at least one outward bayonet lug which projects radially outwards from the lens accessory to be engageable with the two inward bayonet lugs, respectively. The outward bayonet lug is firstly inserted into the front end of the lens barrel and subsequently brought into engagement with the inward bayonet lug, respectively, when the lens accessory is mounted to the lens barrel.

20 Claims, 6 Drawing Sheets

LENS ACCESSORY MOUNTING DEVICE

BACKGROUND OF THE INVENTION

1. Field of the Invention

The present invention relates to a lens accessory mounting device for mounting a lens accessory such as a lens hood, filter, etc., to a lens barrel of a camera.

2. Description of the Related Art

Screw structures and bayonet structures have been conventionally used as devices for mounting a lens accessory such as a lens hood, a filter (optical filter), etc., to the front end of a lens barrel of a camera. The screw structure is composed of a female screw thread portion formed on an inner peripheral surface of a lens barrel at the front end thereof, and a male screw thread portion formed on an outer peripheral surface of the mounting portion of a lens accessory such as a lens hood or a filter so that the male screw thread portion is screw-engaged with the female screw thread portion when the lens accessory is mounted to the lens barrel. In such a screw structure, it is difficult to mount the lens accessory to the lens barrel with the lens accessory being positioned at a specified angle of rotation relative to the lens barrel about the optical axis thereof, and accordingly, the screw structure is used for a lens hood or a filter which is not restricted to such a specified angle.

On the other hand, the bayonet structure makes it possible to mount the lens accessory to the lens barrel with the lens accessory being positioned at a specified angle of rotation relative to the lens barrel about the optical axis thereof, and accordingly, the bayonet structure is used for a petal lens hood or a lens hood having a non-circular-shaped front aperture. As disclosed in Japanese unexamined patent publication H06-265767, the bayonet structure is composed of a set of bayonet lugs or bayonets formed on an outer peripheral surface of a lens barrel at the front end thereof, and another set of bayonet lugs or bayonets formed on an inner peripheral surface of a lens hood at the rear end thereof, wherein firstly the rear end of the lens hood and the front end of the lens barrel are engaged with each other in the optical axis direction of the lens barrel without the set of bayonet lugs of the lens barrel and the set of bayonet lugs of the lens hood overlapping one another in the optical axis direction of the lens barrel, and subsequently, the lens hood and the lens barrel are rotated relative to each other about the optical axis of the lens barrel by a small amount of rotation so that the set of bayonet lugs of the lens barrel are engaged with the set of bayonet lugs of the lens hood, respectively. Each set of bayonet lugs are provided as lugs arranged at different circumferential positions, and the relative position of engagement between the two sets of bayonet lugs can be specified by differentiating the intervals or the lengths of each set of bayonet lugs in a circumferential direction from one another so that the lens hood can be mounted and fixed to the lens barrel at a desired angle of rotation relative to the lens barrel about the optical axis thereof.

As shown in the bayonet structure disclosed in the aforementioned patent publication, a conventional bayonet structure is provided with a set of bayonet lugs formed on an outer peripheral surface of a lens barrel at the front end thereof, and another set of bayonet lugs formed on an inner peripheral surface of the mounting portion of a lens hood. Therefore, in a state where no lens hood is mounted to the lens barrel, the bayonet lugs on an outer peripheral surface of the lens barrel at the front end thereof are exposed, which deteriorates the outward appearance of the lens barrel or the camera to which the lens barrel is mounted. Additionally, the structure of the bayonet lugs which project radially outwards from an outer peripheral surface of the lens barrel at the front end thereof limits the lens design at the front end of the lens barrel, and especially makes the design for mounting a lens cap to the front end of the lens barrel difficult. Specifically, in small and slim cameras produced in recent years, slim lens hoods having a non-circular aperture (usually a rectangular aperture corresponding to the shape of a rectangular picture plane) are available on the market. However, in the case where this type of lens hood is mounted to the lens barrel with a bayonet structure, the outer diameter of the front end of the lens barrel (to which the lens hood is mounted) increases due to the lens hood, which makes it impossible to attach a normal lens cap, which is designed to be attached to the front end of the lens barrel, to the front of the lens barrel (i.e., the front end of the lens hood). In this case, when it is desired to attach a lens cap to the front of the lens barrel, it is necessary to prepare an extra lens cap which has a larger diameter than the normal lens cap in order to correspond to the outer diameter of the lens hood, which increases the number of parts of the camera system.

SUMMARY OF THE INVENTION

The present invention provides a lens accessory mounting device for mounting a lens accessory to a lens barrel using a bayonet structure, wherein the lens accessory mounting device improves the outward appearance of the lens barrel.

The present invention further provides a lens accessory mounting device for mounting a lens accessory to a lens barrel using a bayonet structure, wherein the lens accessory mounting device prevents the diameter of the lens barrel from increasing even in a state where a lens hood is mounted to the lens barrel, to thereby make it possible for a normal lens cap to be attached to the front of the lens barrel to which the lens hood is mounted.

According to an aspect of the present invention, a lens accessory mounting device is provided, for mounting a lens accessory to a front end of a lens barrel, an outer diameter of the lens accessory being substantially the same as an outer diameter of the front end of the lens barrel, the lens accessory mounting device including at least one inward bayonet lug which projects radially inwards from an inner peripheral surface of a front end of the lens barrel; and at least one outward bayonet lug which projects radially outwards from the lens accessory to be engageable with the two inward bayonet lugs, respectively. The outward bayonet lug is firstly inserted into the front end of the lens barrel and subsequently brought into engagement with the inward bayonet lug, respectively, when the lens accessory is mounted to the lens barrel.

It is desirable for the front end of the lens barrel to include a lens hood mounting ring, and for the lens accessory to include a lens hood mountable to the lens hood mounting ring.

It is desirable for the inward bayonet lug to project from an inner peripheral surface of the lens hood mounting ring. The lens hood is formed to have an outer diameter substantially the same as an outer diameter of the lens hood mounting ring, an aperture having a required shape being made in the lens hood. The lens hood includes at least one projection which is provided at a rear end of the lens hood at different circumferential positions to be insertable into the lens hood mounting ring, the outward bayonet lug projecting from the projection.

It is desirable for the lens accessory mounting device to include a lens cap which can be fitted on an outer peripheral surface of the lens hood mounting ring, a length of the lens cap being greater than a length of an outer circumferential surface of the lens hood in an optical axis direction of the lens barrel.

It is desirable for the lens hood mounting ring to include a female screw thread portion formed on an inner peripheral surface of the lens hood mounting ring, an optical filter being mountable to the lens hood mounting ring via the female screw thread portion.

It is desirable for the lens hood to include a female screw thread portion formed on an inner peripheral surface of the lens hood, an optical filter being mountable to the lens hood via the female screw thread portion.

It is desirable for the lens accessory mounting device to include at least one click ball supported by the lens hood mounting ring to be resiliently movable at at least one circumferential position on the lens hood mounting ring; and at least one indentation formed in the lens hood at at least one circumferential position on the lens hood, the click ball being resiliently engaged in the indentation upon the lens hood being properly mounted to the lens hood mounting ring.

It is desirable for the click ball to be installed in a through-hole which is formed in the lens hood mounting ring to extend in an optical axis direction of the lens barrel, and for the lens accessory mounting device to include a biasing device which biases the click ball forward in an optical axis direction of the lens barrel.

It is desirable for the biasing device to include a resilient wave ring fixed to a rear end of the lens hood mounting ring.

It is desirable for the lens accessory mounting device to include two outward bayonet lugs projecting in opposite radial directions away from each other, and two inward bayonet lugs projecting in opposite radial directions approaching each other.

It is desirable for the lens barrel to include a focus ring which is manually rotated to bring an object into focus, the lens hood mounting ring being positioned radially inside of the focus ring.

It is desirable for two click balls, aligned in an optical axis direction of the lens barrel, to be positioned behind each of at least two inward bayonet lugs, and at least two indentations to be formed in at least two projections, respectively, which are provided at a rear end of the lens hood at different circumferential positions to be insertable into the lens hood mounting ring, at least two outward bayonet lugs projecting from the at least two projections, respectively.

In an embodiment, a lens accessory mounting device is provided, for mounting a lens accessory to a front end of a lens barrel, the lens accessory mounting device including two inward bayonet lugs which project radially inwards from an inner peripheral surface of a front end of the lens barrel; two rearward projections which project rearward from the lens accessory to be insertable into the front end of the lens barrel without interfering with the two inward bayonet lugs; and two outward bayonet lugs which project radially outwards from the two rearward projections to be engageable with the two inward bayonet lugs, respectively. The two rearward projections of the lens accessory are firstly inserted into the front end of the lens barrel without interfering with the two inward bayonet lugs, and subsequently the lens accessory is rotated relative to the lens barrel to bring the two outward bayonet lugs into engagement with the two inward bayonet lugs to position the two outward bayonet lugs behind the two inward bayonet lugs, respectively, when the lens accessory is mounted to the lens barrel.

According to the present invention, since the inward bayonet lugs, which are used to mount a lens accessory such as a lens hood to the front end of the lens barrel, are provided on an inner peripheral surface of the front end of the lens barrel, the inward bayonet lugs are not exposed outwardly so as to deteriorate the outward appearance of the lens barrel, which improves outward appearance of the lens barrel. Moreover, in the case where the front end of the lens barrel includes a lens hood mounting ring (13) so that a lens hood (2) can be mounted to the lens barrel via the lens hood mounting ring, various restrictions on the design of the lens hood mounting ring are relaxed, which eases a design for a lens cap mounting structure. Furthermore, since the outer diameter of the lens accessory is substantially the same as the outer diameter of the front end of the lens barrel, mounting the lens accessory to the front end of the lens barrel does not increase the diameter of the lens barrel, and therefore, the normal lens cap which is supplied with the lens barrel can be attached to the front of the lens barrel regardless of whether or not the lens accessory is mounted to the lens barrel, which does not increase the elements of the lens system.

The present disclosure relates to subject matter contained in Japanese Patent Application No. 2006-173419 (filed on Jun. 23, 2006), which is expressly incorporated herein in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
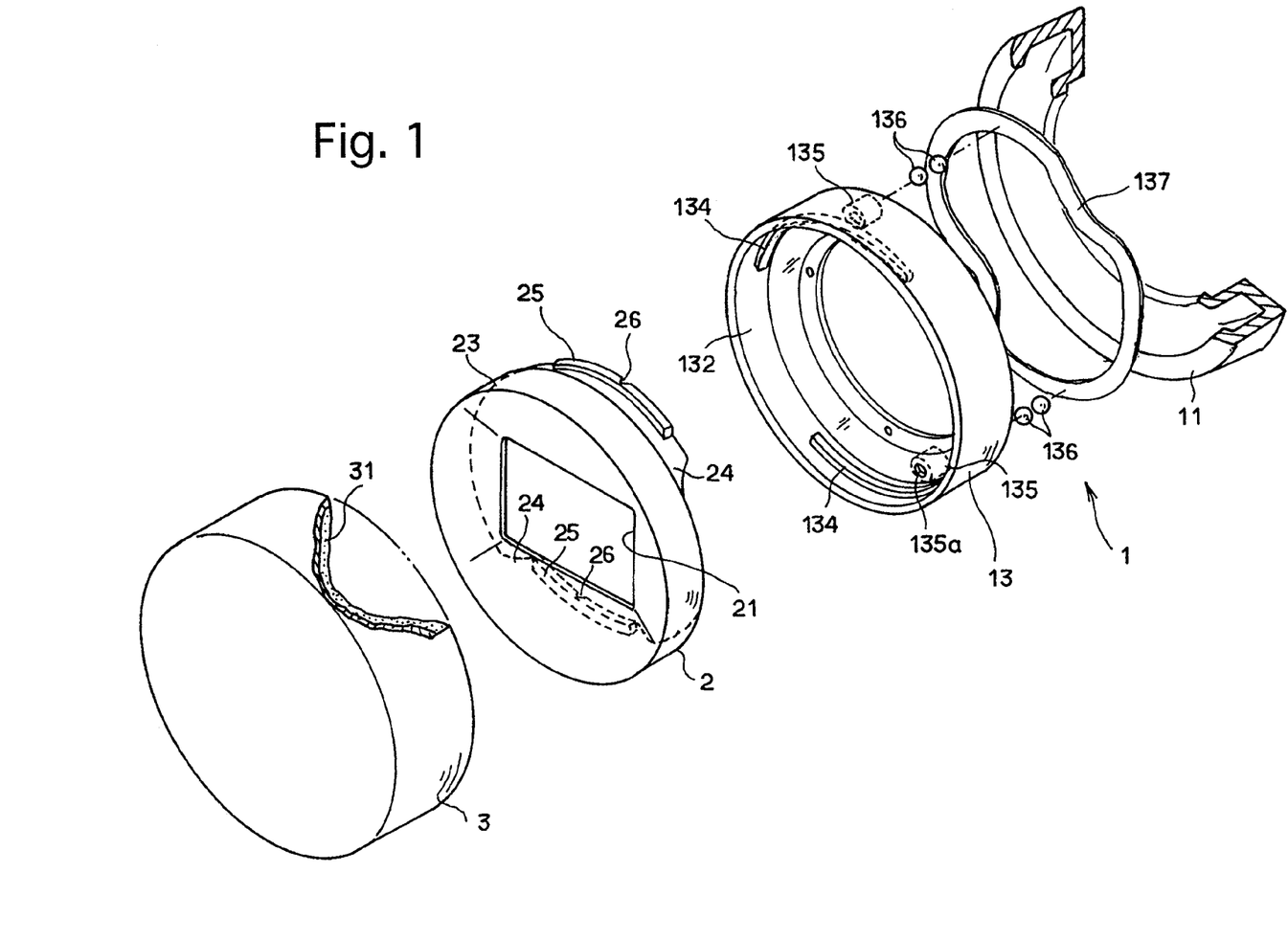
FIG. 1 is an exploded perspective view, with portions broken away for clarity, of elements of an embodiment of a lens accessory mounting device according to the present invention.

FIG. 1 shows a schematic view of an embodiment of a lens accessory mounting device according to the present invention which is applied to an interchangeable lens barrel 1 of a digital camera. The lens barrel 1 is provided at the rear end thereof (not shown in the drawings) with bayonet lugs (lens-side bayonet lugs) engageable with bayonet lugs (body-side bayonet lugs) on a lens mount of a camera body (not shown) to allow the lens barrel to be detachably attached to the camera body. This bayonet structure is the same as a conventional bayonet structure that is well-known in the art, so that the description thereof is omitted. The lens barrel 1 is provided around an outer peripheral surface thereof with a focus ring 11 together with a zoom ring (not shown). Manually rotating the focus ring 11 about an optical axis O of the lens barrel 1 causes a movable lens group L2 that serves as a focusing lens group to move in the direction of the optical axis O (optical axis direction) to bring an object about to be photographed into focus.

The lens barrel 1 is provided at the front end thereof with a bayonet structure for mounting a lens hood 2, which is provided as a lens accessory for the lens barrel 1, to the front end of the lens barrel 1. In this particular embodiment of the lens accessory mounting device, the lens hood 2 is formed in the shape of a shallow circular dish which is substantially identical in outer diameter to the front end of the lens barrel 1. A rectangular aperture 21 which corresponds to the shape of a picture plane is made in the lens hood 2. A cylindrical lens cap 3 which is slightly greater in outer diameter than the lens hood 2 can be detachably attached to the front end of the lens barrel 1.

Figure 2:
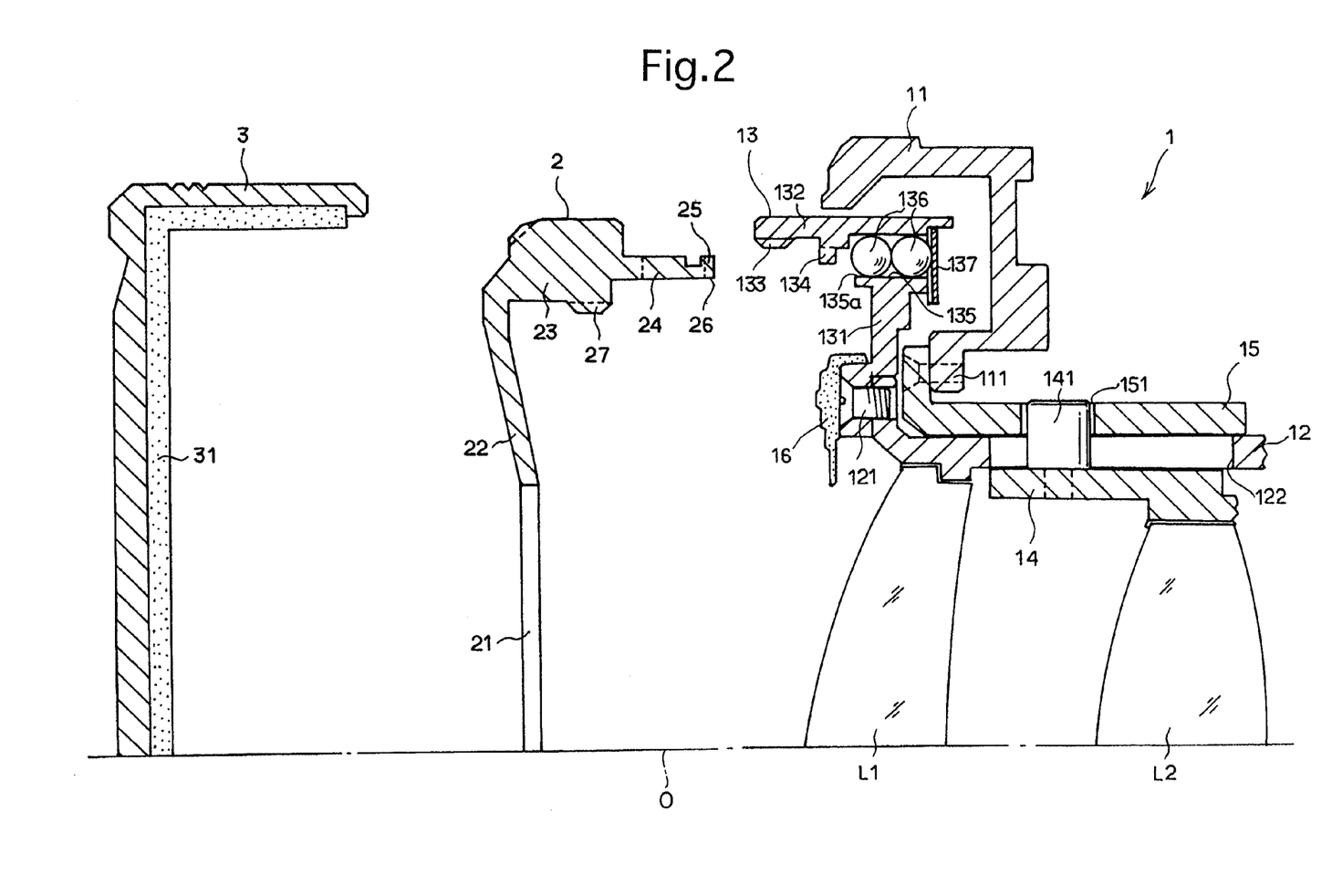
FIG. 2 is an enlarged cross sectional view of elements of the lens accessory mounting device that include a lens hood, a part of a lens barrel to which the lens hood is mounted, and a lens cap, showing only upper halves of these elements from the optical axis of the lens barrel.

FIG. 2 shows an enlarged cross sectional view of elements of the present embodiment of the lens accessory mounting device that include the lens hood 2, a part of the lens barrel 1 to which the lens hood 2 is mounted, and the lens cap 3, showing only upper halves of these elements from the optical axis O. The lens barrel 1 is provided therein with a stationary barrel 12 positioned around the optical axis O, and is further provided at the front end of the stationary barrel 12 with a lens hood mounting ring 13 which is secured to the front end of the stationary barrel 12 by set screws 121 (only one of them is shown in FIG. 2).

The lens barrel 1 is provided radially inside the stationary barrel 12 with a fixed lens group L1. The lens barrel 1 is provided immediately in front of the lens hood mounting ring 13 with a decorative ring 16 which is attached to a front end surface of the lens hood mounting ring 13 along the inner edge of the front end of the lens hood mounting ring 13 to cover a front peripheral end portion of the lens barrel 1 (which includes the heads of the set screws 121) around the fixed lens group L1. The lens barrel 1 is provided radially inside of the stationary barrel 12 with a lens support frame 14 which supports the movable lens group L2. The lens support frame 14 is supported by the stationary barrel 12 to be movable in the optical axis direction relative to the stationary barrel 12.

The lens barrel 1 is provided around the stationary barrel 12 with a focus cam ring 15 which is disposed to be rotatable about the optical axis O relative to the stationary barrel 12. The focus cam ring 15 is joined to the focus ring 11 by set screws 111 (only one of them is shown in FIG. 2) so that the focus cam ring 15 and the focus ring 11 rotate as a single-piece member about the optical axis O. The lens support frame 14 is provided on an outer peripheral surface thereof with a plurality of cam rollers (cam followers) 141 (only one of them is shown in FIG. 2) which project radially outwards to be engaged in a plurality of cam slots 151 made in the focus cam ring 15 through a plurality of linear guide slots 122 made in the stationary barrel 12, respectively. Therefore, manually rotating the focus ring 11 causes the focus cam ring 15 to rotate with the focus ring 11. This rotation of the focus cam ring 15 causes the plurality of cam rollers 141, which are respectively engaged in the plurality of cam slots 151, to move in the optical axis direction, thus causing the lens support frame 14, which is integral with the plurality of cam rollers 141, and the movable lens group L2, which is supported by the lens support frame 14, to move in the optical axis direction to carry out a focusing operation (focus adjusting operation).

The lens hood mounting ring 13 is provided as a front end part of the lens barrel 1 according to the present invention. The lens hood mounting ring 13 is provided with a flange portion 131 having a substantially disk shape, and a short-cylindrical sleeve portion 132 which extends forward in the optical axis direction from the outer edge of the flange portion 131. The flange portion 131 and the sleeve portion 132 of the lens hood mounting ring 13 form a cross sectional shape of a letter "L". The front end of the sleeve portion 132 projects forward in front of the front end of the focus ring 11 in the optical axis direction. The lens hood mounting ring 13 is provided on an inner peripheral surface of the sleeve portion 132 with a female screw thread portion 133 for mounting a lens filter (optical filter) to the front end of the sleeve portion 132. The lens hood mounting ring 13 is provided, on an inner peripheral surface of the sleeve portion 132 behind the female screw thread portion 133 in the optical axis direction, with a pair of inward bayonet lugs (bayonets) 134 which project radially inwards from two radially-opposed areas on the inner peripheral surface of the sleeve portion 132, respectively, with a slight clearance between the front surface of the flange portion 131 and the pair of inward bayonet lugs 134 in the optical axis direction.

The lens hood mounting ring 13 is provided with two through-holes 135 which are made to extend in the optical axis direction at two positions corresponding to the aforementioned two radially-opposed areas on the inner peripheral surface of the sleeve portion 132, from which the pair of inward bayonet lugs (bayonets) 134 project, respectively. Two click balls 136 having the same dimensions are installed in each through-hole 135 to be aligned in the optical axis direction. Each through-hole 135 has a front opening 135a which is smaller in diameter than the click balls 136. The diameter of the front opening 135a of each through-hole 135 is determined to allow only a part of the spherical surface of the associated front click ball 136 (the left click ball as viewed in FIG. 2) to project forward from the front opening 135a. A resilient wave ring or a corrugated resilient annular plate 137 which is corrugated in the optical axis direction is secured to a rear surface of the flange portion 131 by set screws (not shown) to be in intimate contact with each rear click ball 136 at the rear end part thereof to bias each rear click ball 136 forwardly in the optical axis direction. With this structure, spherical surfaces of the two front click balls 136 are maintained to partly project forward resiliently from the front openings 135a of the two through-holes 135, respectively.

The lens hood 2 is provided with a front circular plate 22 at a center of which the aforementioned rectangular aperture 21 is formed. The front circular plate 22 is inclined rearwards in radially inward directions, toward the rectangular aperture 21, to a certain extent. The rim (outer circumferential surface) 23 of the lens hood 2 is greater in thickness than the front circular plate 22, and is provided, in two areas on a rear end surface of the rim 23 at radially-opposed positions, with a pair of rearward projections 24, respectively, which project rearward in the optical axis direction. Each rearward projection 24 is smaller in radial thickness than the rim 23 of the lens hood 2. Outer peripheral surfaces of the pair of rearward projections 24 lie in an imaginary cylindrical surface about the axis of the lens hood 2, and this imaginary cylindrical surface is slightly smaller in diameter than the inner peripheral surface of the sleeve portion 132. The pair of rearward projections 24 are provided at rear ends thereof with a pair of outward bayonet lugs (bayonets) 25 which are formed integral with the pair of rearward projections 24 to project radially outwards, respectively. The pair of rearward projections 24 are provided with a pair of small notches (V-shaped indentations) 26 which are notched forwardly in the optical axis direction from the rear ends of the pair of rearward projections 24, respectively. The lens hood 2 is provided, on an inner peripheral surface of the rim 23 with a female screw thread portion 27 for mounting a hood filter (optical filter) 5 (see FIG. 6) to the lens hood 2.

The lens cap 3 is formed in a short-length bottomed cylindrical shape so that the inner diameter thereof is slightly greater than the outer diameter of the lens hood mounting ring 13. A woolen cloth 31 is adhered to the inner surface of the lens cap 3 (i.e., to each of the round bottom surface of the lens cap 3 and the inner peripheral surface of the outer ring wall of the lens cap 3). The woolen cloth 31 functions as a cushion. In addition, a part of the woolen cloth 31 which is adhered to the inner peripheral surface of the outer ring wall of the lens cap 3 is used to make the inner diameter of the lens cap 3 slightly smaller than the outer diameter of the lens hood mounting ring 13 and also to make the inner diameter of the lens cap 3 slightly smaller than the outer diameter of the lens hood 2. Additionally, the lens cap 3 is formed to be slightly greater in length than the rim 23 of the lens hood 2 in the optical axis direction, to be capable of being attached to the lens hood mounting ring 13 even in a state where the lens hood 2 is mounted to the lens barrel 1.

Figure 3:
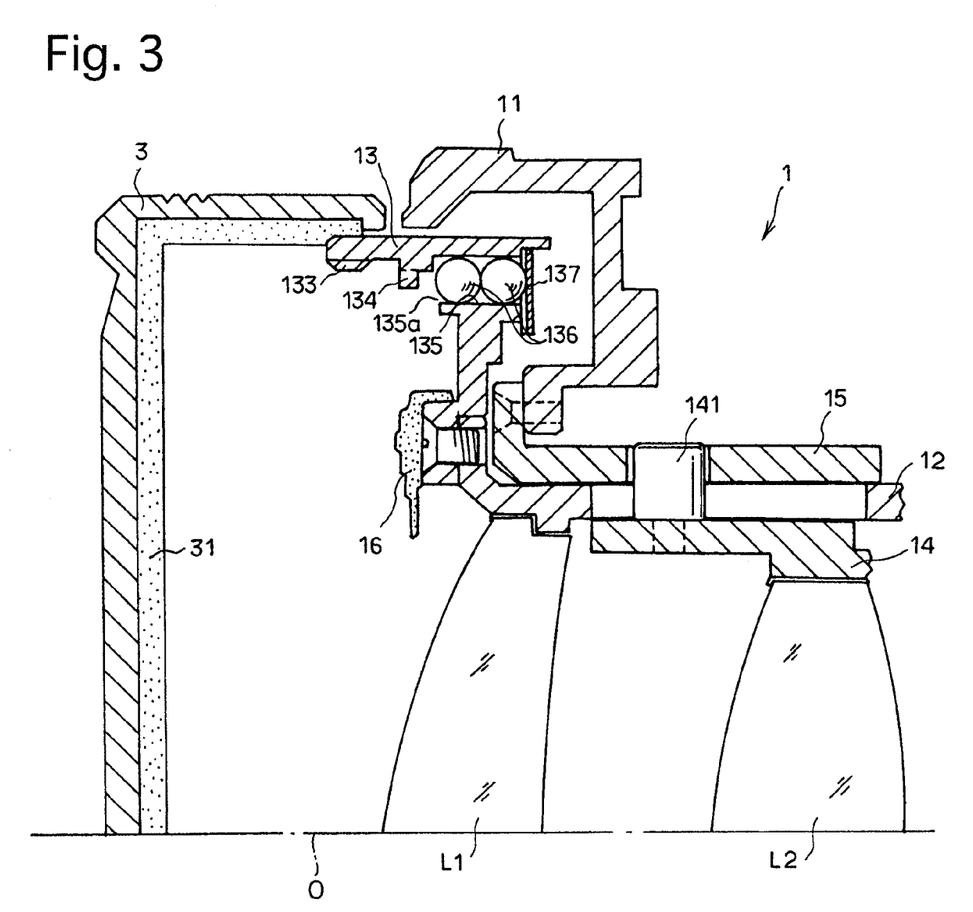
FIG. 3 is a cross sectional view of the lens barrel to which the lens cap is attached, showing only upper halves thereof from the optical axis of the lens barrel.
Figure 4:
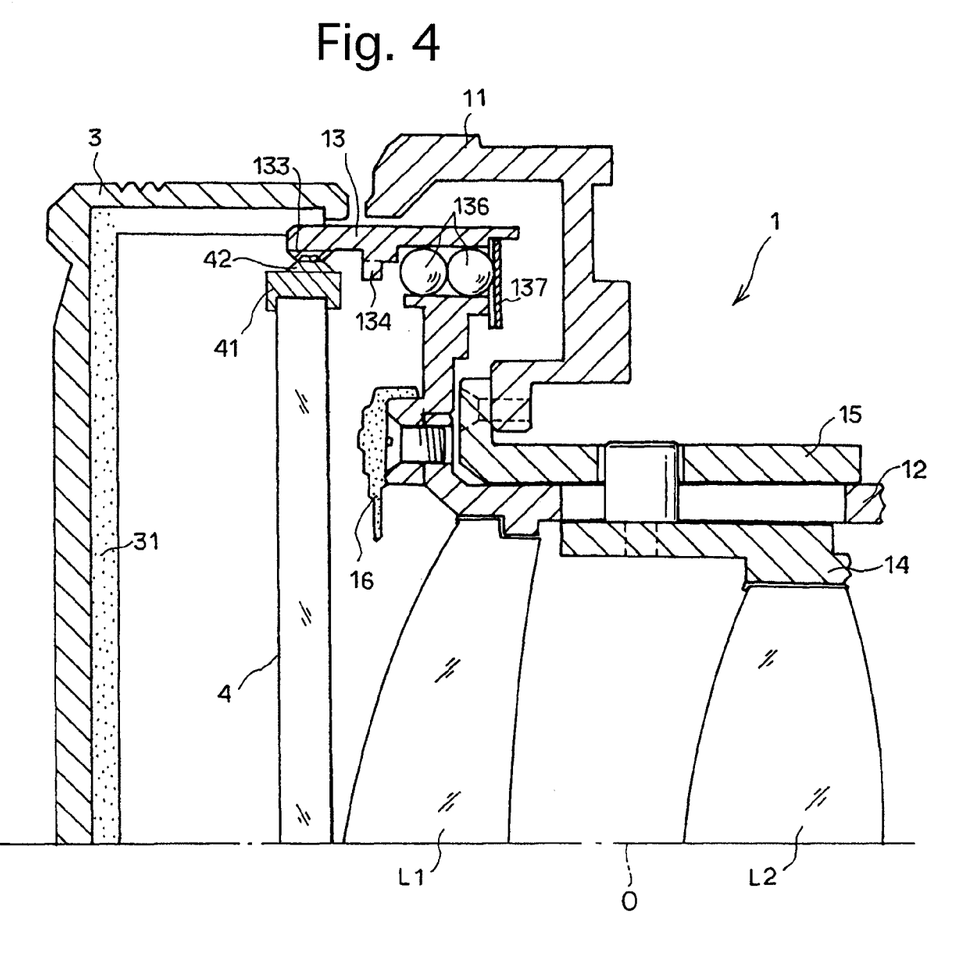
FIG. 4 is a cross sectional view of the lens barrel to which an optical filter and the lens cap are attached, showing only upper halves of these elements from the optical axis of the lens barrel.

According to the above described structure, in a state where the lens hood 2 is not mounted to the lens barrel 1, the lens cap 3 is directly attached to the lens hood mounting ring 13 as shown in FIG. 3 when the lens cap 3 is attached to the lens barrel 1. Since the inner diameter of the woolen cloth 31 adhered to the inner peripheral surface of the lens cap 3 is slightly smaller than the outer diameter of the lens hood mounting ring 13, the lens cap 3 is fitted on the front end of the lens hood mounting ring 13 from the outside thereof while slightly deforming the woolen cloth 31 in the direction of thickness thereof, i.e., in radial directions of the lens cap 3. At this time, the lens cap 3 is engaged with an outer peripheral surface of the lens hood mounting ring 13 with a coefficient of friction of the woolen cloth 31 that prevents the lens cap 3 from coming off. In this state, if a necessity for mounting a lens filter to the lens barrel 4 arises, a desired lens filter (optical filter) 4 can be mounted to the lens hood mounting ring 13 via the female screw thread portion 133 as shown in FIG. 4. More specifically, a circular frame 41 of the lens filter 4 is provided on an outer peripheral surface thereof with a male screw tread portion 42, and the lens filter 4 can be mounted to the lens hood mounting ring 13 via the engagement of the male screw tread portion 42 with the female screw thread portion 133, which is provided on an inner peripheral surface of the sleeve portion 132 at the front end thereof. The circular frame 41 of the lens filter 4 is formed so that the outer diameter of the circular frame 41 corresponds to the inner diameter of the front end portion of the lens hood mounting ring 13. The lens filter 4 can be any kind of optical filter such as a polarized filter or a cut filter.

Figure 5:
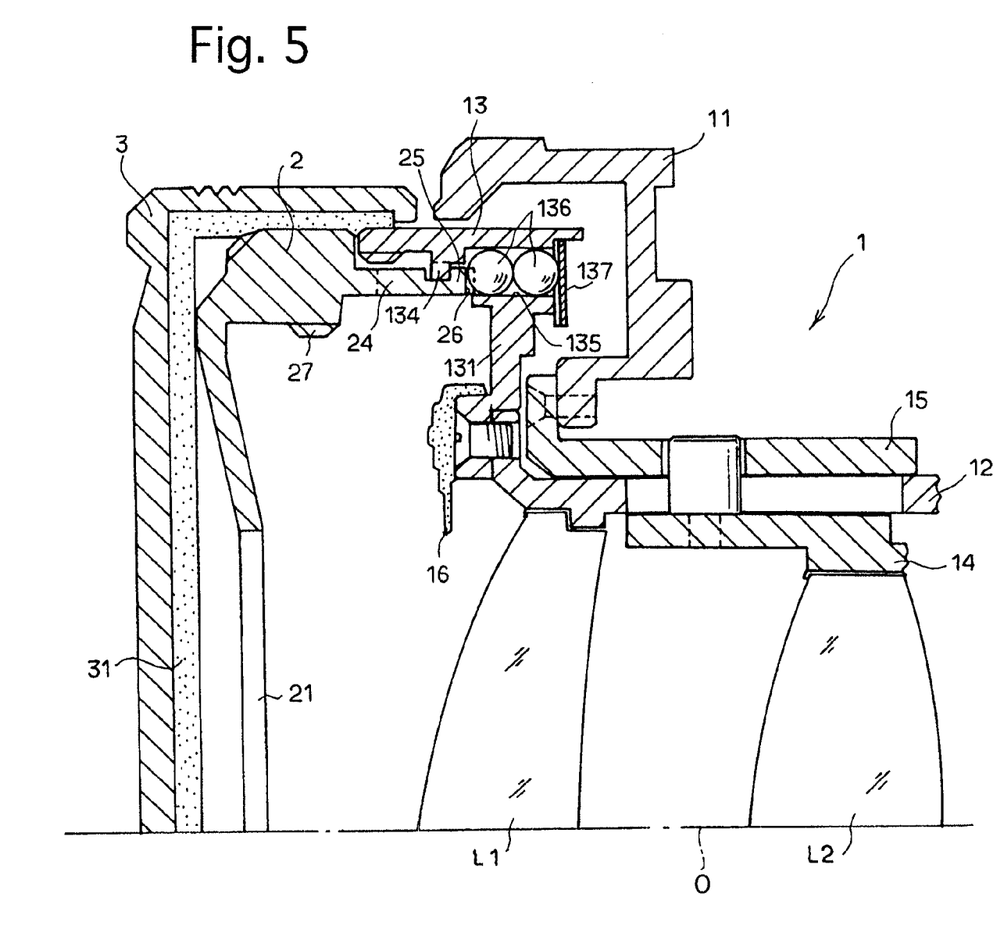
FIG. 5 is a cross sectional view of the lens barrel to which the lens hood and the lens cap are attached, showing only upper halves of these elements from the optical axis of the lens barrel.

On the other hand, when the lens hood 2 is mounted to the lens barrel 1, as shown in FIG. 5, the pair of rearward projections 24 of the lens hood 2 are inserted into the lens hood mounting ring 13 upon both the lens cap 3 and the lens filter 4 (in the state shown in FIG. 4) being removed, and subsequently the pair of outward bayonet lugs 25 are engaged with the pair of inward bayonet lugs 134, respectively. In this lens hood mounting operation, firstly the pair of rearward projections 24 of the lens hood 2 are inserted into the lens hood mounting ring 13 so as not to abut against the pair of inward bayonet lugs 134; in the particular case shown in FIG. 1, the pair of rearward projections 24 of the lens hood 2 are inserted into the lens hood mounting ring 13 after the lens hood 1 is rotated about the optical axis O to make the pair of rearward projections 24 aligned laterally. This brings the pair of outward bayonet lugs 25, which are respectively provided on the pair of rearward projections 24, into contact with the front surface of the flange portion 131 of the lens hood mounting ring 13 upon the pair of rearward projections 24 being fully inserted into the lens hood mounting ring 13. In this state, rotating the lens hood 2 about the optical axis O by approximately 90 degrees causes the pair of outward bayonet lugs 25 to be inserted into a pair of clearances (circumferential grooves) between the front surface of the flange portion 131 and the pair of inward bayonet lugs 134 to be engaged with the pair of inward bayonet lugs 134 in the pair of clearances, respectively. In other words, the pair of outward bayonet lugs 25 are positioned behind the pair of inward bayonet lugs 134 in the optical axis direction, respectively. The lens hood 2 is held by the lens hood mounting ring 13 by the frictional engaging force between the pair of outward bayonet lugs 25 and the pair of inward bayonet lugs 134, which achieves the installation of the lens hood 2 to the lens barrel 1.

In this rotating operation of the lens hood 2 about the optical axis O by 90 degrees, when the pair of outward bayonet lugs 25 rotate about the optical axis O to pass by the front openings 135a of the two through-holes 135, respectively, the two front click balls 136 that partly project forward from the front openings 135a of the two through-holes 135 are pushed back into the two through-holes 135 while resiliently deforming the resilient wave ring 137 via the two rear click balls 136, respectively; thus allowing the pair of outward bayonet lugs 25 to rotate about the optical axis O to pass by the front openings 135a of the two through-holes 135, respectively. Thereafter, upon the lens hood 2 being rotated to a predetermined installation position at which the pair of small notches 26 face the two front openings 135a of the lens hood mounting ring 13, respectively, the two front click balls 136 move slightly forward from the two front openings 135a, respectively, by resiliency of the resilient wave ring 137 so that spherical surfaces of the two front click balls 136 which project forward from the two front openings 135a are partly engaged in the pair of small notches 26, respectively.

With this engagement of the two front click balls 136 with the pair of small notches 26, the lens hood 2 is held at this rotation position stably by the lens hood mounting ring 13, and a tactile "click" is felt by the user upon engagement of the two front click balls 136 with the pair of small notches 26. Therefore, the user of the camera to which the lens barrel 1 is mounted can perceive that the lens hood 2 has been mounted to the lens hood mounting ring 13 at a correct predetermined installation position. When the lens hood 2 is dismounted, the lens hood 2 can be removed forward from the lens hood mounting ring 13 in the optical axis direction by rotating the lens hood 2 in the reverse direction relative to the lens hood mounting ring 13 to disengage the pair of outward bayonet lugs 25 from the pair of inward bayonet lugs 134, respectively. At this time, the pair of small notches 26 stride across the two front click balls 136, respectively, so as not to prevent the lens hood 2 from being dismounted from the lens hood mounting ring 13.

When the lens cap 3 is attached to the lens barrel 1 with the lens hood 2 mounted to the lens barrel 1, the lens cap 3 is fitted on both the lens hood 2 and the lens hood mounting ring 13 as shown in FIG. 5. Since the inner diameter of the woolen cloth 31 on the inner peripheral surface of the lens cap 3 is slightly smaller than the outer diameter of the lens hood 2, the lens cap 3 is fitted on the lens hood 2 from the outside thereof while slightly deforming the woolen cloth 31 in radial directions of the lens cap 3. At this time, the lens cap 3 is engaged with an outer peripheral surface of the lens hood 2 with a coefficient of friction of the woolen cloth 31 that prevents the lens cap 3 from coming off. In this case, it is possible that the lens cap 3 be fitted only on the lens hood 2; the length of the lens cap 3 in the optical axis direction can be reduced if the lens cap 3 needs to be fitted only on the lens hood 2.

Figure 6:
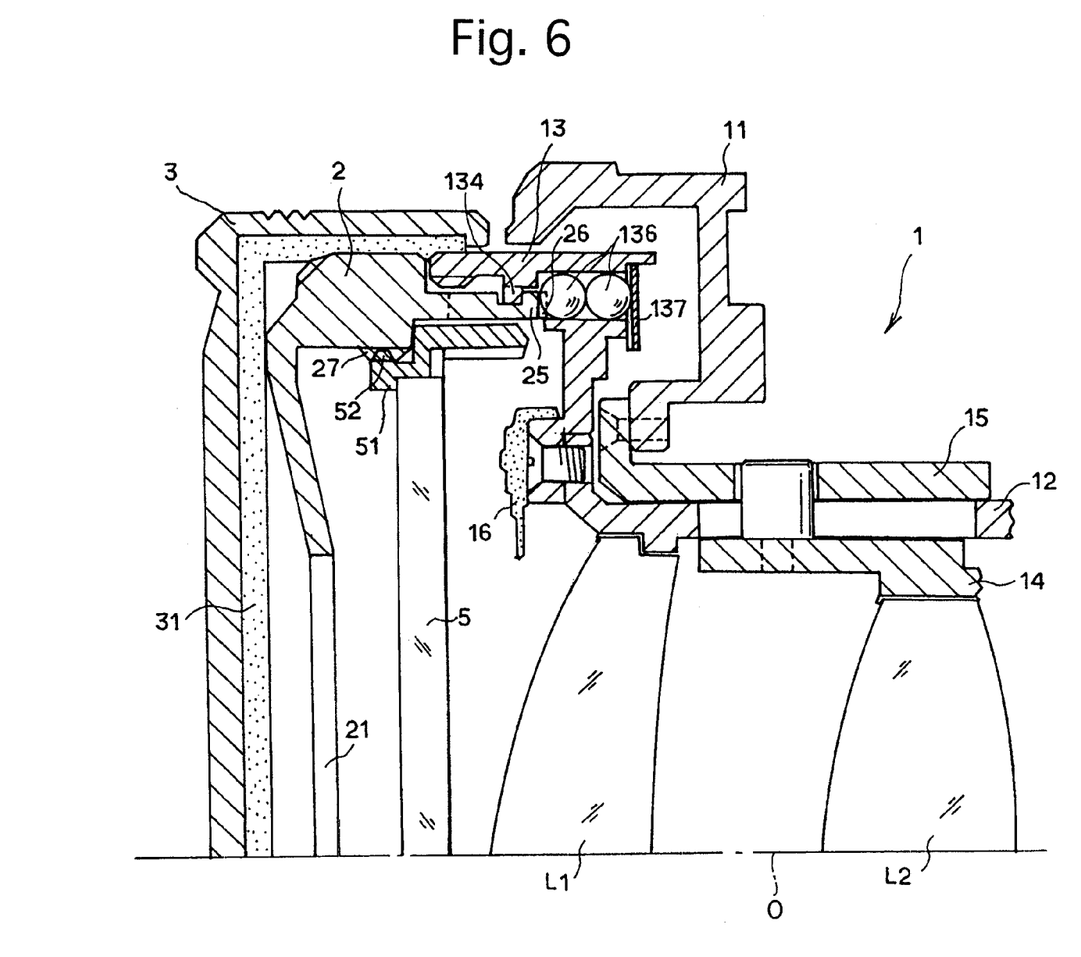
FIG. 6 is a cross sectional view of the lens barrel to which the lens hood, an optical filter and the lens cap are attached, showing only upper halves of these elements from the optical axis of the lens barrel.

Additionally, if a necessity for mounting an optical filter to the lens barrel 1 arises in a state shown in FIG. 5, a desired hood filter (optical filter) 5 can be mounted to the lens hood 2 via the female screw thread portion 27 thereon by screwing the hood filter 5 into the lens hood 2 as shown in FIG. 6. The structure of the hood filter 5 is substantially the same as the structure of the lens filter 4; specifically, a circular frame 51 of the hood filter 5 is provided on an outer peripheral surface thereof with a male screw tread portion 52, and the hood filter 5 can be mounted to the lens hood 2 via the engagement of the male screw tread portion 52 with the female screw thread portion 27 of the lens hood 2. In addition, the hood filter 5 is formed so that the shape and the outer diameter of the circular frame 51 correspond to the inner diameter of the lens hood 2.

As described above, in the above illustrated embodiment of the lens accessory mounting device, since the pair of inward bayonet lugs 134, which are formed on the lens hood mounting ring 13 to mount the lens hood 2 to the lens barrel 1, are formed on an inner peripheral surface of the lens hood mounting ring 13, the pair of inward bayonet lugs 134 are not exposed outwardly so as to deteriorate the outward appearance of the lens barrel 1, which is effective at improving the outward appearance of the lens barrel 1. Moreover, mounting the lens hood 2 to the lens barrel 1 does not increase the diameter of the lens barrel and therefore the lens cap 3 can be attached to the front of the lens barrel 1 even if the lens hood 2 is mounted to the lens barrel 1 since the outer diameters of the lens hood 2 and the lens hood mounting ring 13 are substantially the same. Accordingly, the supplied normal lens cap that comes with the lens barrel 1 can be attached to the front of the lens barrel 1 to which the lens hood 2 is mounted, which does not increase the elements of the lens system.

In the above illustrated embodiment, since the rectangular aperture 21 of the lens hood 2 is vertically-symmetric in shape and since the pair of inward bayonet lugs 134 on the lens hood mounting ring 13 and the pair of outward bayonet lugs 25 on the lens hood 2 are each arranged in two radially-opposed areas, the lens hood 2 can be mounted to the lens hood mounting ring 13 at not only a single specified angle about the optical axis O with respect to the lens barrel 1, but also at another angle (with a phase difference of 180 degrees from the aforementioned specified angle with respect to the lens barrel 1) with respect to the lens barrel 1 when the lens hood 2 is mounted to the lens barrel 1, which facilitates the lens hood mounting operation for mounting the lens hood 2 to the lens barrel. However, the present invention is not limited solely to this particular structure; the number of the outward bayonet lugs 25 and the number of the inward bayonet lugs 134 can be more than two as long as the orientation of the lens hood 2 with respect to the lens barrel 1 when the lens hood 2 is mounted to the lens barrel 1 can be specified.

Additionally, although two click balls 136 are installed in each through-hole 135 to be aligned in the optical axis direction so as to secure a sufficient range in the optical axis direction in the above illustrated embodiment of the lens accessory mounting device, it is possible to only have one click ball installed in each through-hole corresponding to each through-hole 135.

Lens accessories for the lens barrel configured according to the present invention are not limited solely to particular lens hoods such as the above illustrated lens hood 2. Namely, in a manner similar to that of the above described embodiment, the present invention can also be applied to any other lens accessory such as a special lens, an auxiliary lens, another type of optical accessory, etc., which can be mounted to the front end of the lens barrel. In addition, the present invention is not limited solely to the particular structure of the above described lens barrel, e.g., the present invention can be applied to any other lens barrels as long as they are provided at the front ends thereof with a lens hood mounting ring or a similar ring member.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens accessory mounting device for mounting a lens accessory to a front end of a lens barrel having an optical axis, an outer diameter of said lens accessory being substantially the same as an outer diameter of said front end of said lens barrel, said lens accessory mounting device comprising:
    at least one inward bayonet lug which projects radially inwards from an inner peripheral surface of a cylindrical sleeve portion of a front end of the lens barrel, the at least one inward bayonet lug being spaced from ends of the cylindrical sleeve portion in an optical axis direction; and
    at least one outward bayonet lug which projects radially outwards from a surface of said lens accessory that is recessed from an outermost peripheral surface of said lens accessory to be engageable with said at least one inward bayonet lug, respectively,
    wherein said at least one outward bayonet lug is firstly inserted into said front end of said lens barrel and subsequently brought into engagement with said at least one inward bayonet lug, respectively, when said lens accessory is mounted to said front end of the lens barrel.

2. The lens accessory mounting device according to claim 1, wherein said front end of said lens barrel comprises a lens hood mounting ring, and
    wherein said lens accessory comprises a lens hood mountable to said lens hood mounting ring.

3. The lens accessory mounting device according to claim 2, wherein said inward bayonet lug projects from an inner peripheral surface of said lens hood mounting ring,
    wherein said lens hood has an outer diameter substantially the same as an outer diameter of said lens hood mounting ring, an aperture having a predetermined shape being provided in said lens hood, and
    wherein said lens hood includes at least one projection which is provided at a rear end of said lens hood to be insertable into said lens hood mounting ring, said outward bayonet lug projecting from said projection, said projection projecting in the optical axis direction.

4. The lens accessory mounting device according to claim 3, further comprising a lens cap mountable on an outer peripheral surface of said lens hood mounting ring, a length of said lens cap being greater than a length of an outer circumferential surface of said lens hood in the optical axis direction of said lens barrel.

5. The lens accessory mounting device according to claim 2, wherein said lens hood mounting ring comprises a female screw thread portion provided on an inner peripheral surface of said lens hood mounting ring, an optical filter being mountable to said lens hood mounting ring via said female screw thread portion.

6. The lens accessory mounting device according to claim 2, wherein said lens hood comprises a female screw thread portion provided on an inner peripheral surface of said lens hood, an optical filter being mountable to said lens hood via said female screw thread portion.

7. The lens accessory mounting device according to claim 2, further comprising:
at least one click ball supported by said lens hood mounting ring to be resiliently movable in a direction parallel to the optical axis direction, the at least one click ball being positioned at at least one circumferential position on said lens hood mounting ring; and
at least one indentation formed in said lens hood at at least one circumferential position on said lens hood, a peripheral portion of said at least one click ball being resiliently engaged in said indentation upon said lens hood being properly mounted to said lens hood mounting ring.

8. The lens accessory mounting device according to claim 7, wherein said click ball is installed in a through-hole in said lens hood mounting ring to project through the through-hole in an optical axis direction of said lens barrel, and
a biasing device which biases said click ball forward in the optical axis direction of said lens barrel.

9. The lens accessory mounting device according to claim 8, wherein said biasing device comprises a resilient wave ring provided at a rear end of said lens hood mounting ring.

10. The lens accessory mounting device according to claim 7, wherein two said click balls, aligned in an optical axis direction of said lens barrel, are positioned behind each of said at least one inward bayonet lug, said at least one projection comprising two projections, and
wherein at least two said indentations are provided in said, respectively, which are provided at a rear end of said lens hood at different circumferential positions to be insertable into said lens hood mounting ring, at least two said outward bayonet lugs projecting from said at least two projections, respectively.

11. The lens accessory mounting device according to claim 7, said indentation being positioned, circumferenentially, within a circumferential extent of the at least one outward bayonet lug.

12. The lens accessory mounting device according to claim 2, wherein said lens barrel comprises a focus ring which is manually rotatable to bring an object into focus, said lens hood mounting ring being positioned radially inside of said focus ring.

13. The lens accessory mounting device according to claim 2, said lens hood mounting ring comprising a cylindrical portion extending in the optical axis direction and having a predetermined length in the optical axis direction, said at least one inward bayonet lug being positioned along the predetermined length intermediate the ends of the cylindrical portion.

14. The lens accessory mounting device according to claim 1, further comprising:
said at least one outward bayonet lug comprising two outward bayonet lugs projecting in opposite radial directions away from each other; and
said at least one inward bayonet lug comprising two inward bayonet lugs projecting in opposite radial directions approaching each other.

15. The lens accessory mounting device according to claim 1, wherein said front end of said lens barrel comprises a member having a first surface extending in a plane perpendicular to the optical axis direction and a second cylindrical surface extending from an outer extremity of the first surface forwardly along the optical axis direction;
an aperture provided in the first surface, a plurality of click balls being positioned behind said aperture in the optical axis direction, an annular resilient wave spring being positioned at a rear end of said front end of said lens barrel, a surface of said resilient wave spring extending in a direction transverse to the optical axis direction and bearing against a rearmost one of said plurality of click balls to bias said plurality of click balls forward in the optical axis direction, a portion of a surface of a frontmost one of said plurality of click balls protruding through said aperture and being engageable with an indentation provided within a circumferential extent of said at least one outward bayonet lug.

16. The lens accessory mounting device according to claim 1, said front end of the lens barrel and said lens accessory being configured such that when said lens accessory is mounted to said front end of said lens barrel, a circumferential location of said inward and outward bayonet lugs is not apparent from an exterior of said lens accessory mounting device.

17. The lens accessory mounting device according to claim 1, the inner surface, from which said at least one inward bayonet lug projects radially, is spaced inwardly from an exterior circumferential surface of the front end of the lens barrel.

18. A lens accessory mounting device for mounting a lens accessory to a front end of a lens barrel having an optical axis, said lens accessory mounting device comprising:
two inward bayonet lugs which project radially inwards from an inner peripheral surface of a cylindrical sleeve portion of a front end of the lens barrel, the two inward bayonet lugs being spaced from ends of the cylindrical sleeve portion in an optical axis direction;
two rearward projections which project rearward from said lens accessory to be insertable into said front end of said lens barrel without interfering with said two inward bayonet lugs, said two rearward projections being positioned closer to the optical axis than outer peripheral surfaces of said lens barrel and of said lens accessory; and
two outward bayonet lugs each of which project radially outwards from a surface of said two rearward projections to be engageable with said two inward bayonet lugs, respectively,
wherein said two rearward projections of said lens accessory are firstly inserted into said front end of said lens barrel without interfering with said two inward bayonet lugs, and subsequently said lens accessory is rotated relative to said lens barrel to bring said two outward bayonet lugs into engagement with said two inward bayonet lugs to position said two outward bayonet lugs behind said two inward bayonet lugs, respectively, when said lens accessory is mounted to said lens barrel.

19. The lens accessory mounting device according to claim 18, wherein said front end of said lens barrel comprises a member having a first surface extending in a plane perpendicular to the optical axis direction and a second cylindrical surface extending from an outer extremity of the first surface forwardly along the optical axis direction;
two apertures provided in the first surface, a plurality of click balls being positioned behind each said aperture in the optical axis direction, an annular resilient wave spring being positioned at a rear end of said front end of said lens barrel, a surface of said resilient wave spring extending in a direction transverse to the optical axis direction and bearing against a rearmost one of said plurality of click balls forward to bias said plurality of click balls in the optical axis direction foreword, a portion of a surface of a frontmost one of said plurality of click balls protruding through each said aperture and being engageable with an indentation provided within a circumferential extent of each of said outward bayonet lugs.

20. The lens accessory mounting device according to claim 18, said front end of the lens barrel and said lens accessory being configured such that when said lens accessory is mounted to said front end of said lens barrel, a circumferential location of said inward and outward bayonet lugs is not apparent from an exterior of said lens accessory mounting device.

* * * * *